United States Patent
Nishimukai et al.

(10) Patent No.: US 6,779,102 B2
(45) Date of Patent: Aug. 17, 2004

(54) DATA PROCESSOR CAPABLE OF EXECUTING AN INSTRUCTION THAT MAKES A CACHE MEMORY INEFFECTIVE

(75) Inventors: Tadahiko Nishimukai, Sagamihara (JP); Atsushi Hasegawa, Koganei (JP); Kunio Uchiyama, Hachioji (JP); Ikuya Kawasaki, Kodaira (JP); Makoto Hanawa, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/886,267

(22) Filed: Jun. 22, 2001

(65) Prior Publication Data
US 2001/0032296 A1 Oct. 18, 2001

Related U.S. Application Data

(62) Division of application No. 09/396,414, filed on Sep. 15, 1999, now Pat. No. 6,272,596, which is a continuation of application No. 09/113,550, filed on Jul. 10, 1998, now Pat. No. 5,974,533, which is a continuation of application No. 08/886,464, filed on Jul. 1, 1997, now Pat. No. 5,809,274, which is a continuation of application No. 07/978,069, filed on Nov. 18, 1992, now Pat. No. 5,680,631, which is a continuation of application No. 07/596,752, filed on Oct. 12, 1990, now abandoned, which is a continuation of application No. 07/238,260, filed on Aug. 30, 1998, now abandoned, which is a division of application No. 06/840,433, filed on Mar. 17, 1986, now abandoned.

(30) Foreign Application Priority Data

Mar. 15, 1985 (JP) .............................................. 60-50512

(51) Int. Cl.⁷ ........................ G06F 15/78; G06F 12/10; G06F 12/12; G06F 13/16
(52) U.S. Cl. ........................... 712/42; 712/36; 712/211; 712/245; 712/248; 711/123; 711/125; 711/128; 711/133; 711/135; 711/144; 711/145; 711/205; 711/206; 711/207
(58) Field of Search ................................ 711/118, 123, 711/125, 128, 133, 135, 144, 145, 213, 214, 206, 207, 205; 712/245, 36, 248, 42, 211

(56) References Cited

U.S. PATENT DOCUMENTS

| | | | |
|---|---|---|---|
| 3,618,041 A | 11/1971 | Horikoshi | 364/200 |
| 3,781,823 A | * 12/1973 | Senese | 712/209 |
| 3,845,474 A | 10/1974 | Lange et al. | 364/200 |
| 3,859,636 A | 1/1975 | Cook | 364/200 |
| 3,979,726 A | 9/1976 | Lange et al. | 364/200 |
| 4,011,547 A | 3/1977 | Kimmel | 364/200 |
| 4,179,736 A | 12/1979 | Wilhite | 364/200 |
| 4,264,953 A | 4/1981 | Douglas et al. | 209/326 |

(List continued on next page.)

FOREIGN PATENT DOCUMENTS

| | | |
|---|---|---|
| JP | 50-138738 | 11/1975 |
| JP | 57-15494 | 6/1980 |

OTHER PUBLICATIONS

*Integrated MMU, Cache/Raise System–Level Issues,* Sorin Lacobovici et al., Computer Design, vol. 26, No. 10, May 15, 1987, pp. 75–79.

*MC68020 32–Bit Microprocessor User's Manual,* Second Edition, Englewood Cliffs, NJ, Prentice Hall, Inc., 1984, pp. 1 –2, 1–9/1–10, 6–8, 7–1 to 7–4.

(List continued on next page.)

*Primary Examiner*—Daniel H. Pan
(74) *Attorney, Agent, or Firm*—Kenyon & Kenyon

(57) ABSTRACT

A data processor formed on a LSI chip has an instruction address generator, an instruction cache memory having entries each storing an instruction address and an instruction corresponding to the instruction address, an instruction decoder decoding an instruction from said cache memory corresponding to an instruction address from said instruction address generator, an operand address generator generating an operand address in response to an output signal of said instruction decoder, and an operand cache memory having entries each storing an operand address and operand data corresponding to the operand address in its entry. The data processor executes an instruction that makes entries in both of said instruction cache memory and said operand cache memory ineffective.

89 Claims, 12 Drawing Sheets

U.S. PATENT DOCUMENTS

| | | | | |
|---|---|---|---|---|
| 4,295,193 A | | 10/1981 | Pomerene | 395/375 |
| 4,312,034 A | | 1/1982 | Gunter et al. | 364/200 |
| 4,322,795 A | | 3/1982 | Lange et al. | 395/425 |
| 4,325,121 A | | 4/1982 | Gunter et al. | 364/200 |
| 4,332,010 A | | 5/1982 | Messina et al. | 711/3 |
| 4,342,078 A | | 7/1982 | Tredennick et al. | 364/200 |
| 4,439,829 A | * | 3/1984 | Tsiang | 711/118 |
| 4,441,155 A | * | 4/1984 | Fletcher et al. | 711/3 |
| 4,442,488 A | | 4/1984 | Hall | 364/200 |
| 4,456,954 A | | 6/1984 | Bullions, III et al. | 395/400 |
| 4,471,429 A | | 9/1984 | Porter et al. | 364/200 |
| 4,471,432 A | | 9/1984 | Wilhite et al. | 364/200 |
| 4,481,573 A | | 11/1984 | Fukunaga et al. | 364/200 |
| 4,502,110 A | | 2/1985 | Saito | 364/200 |
| 4,521,850 A | | 6/1985 | Wilhite et al. | 364/200 |
| 4,521,851 A | | 6/1985 | Trubisky et al. | 364/200 |
| 4,530,050 A | | 7/1985 | Fukunaga et al. | 364/200 |
| 4,551,798 A | | 11/1985 | Horvath | 364/200 |
| 4,551,799 A | | 11/1985 | Ryan et al. | 364/200 |
| 4,602,368 A | | 7/1986 | Circello et al. | 364/900 |
| 4,608,633 A | | 8/1986 | Boothroyd et al. | 364/200 |
| 4,646,233 A | | 2/1987 | Weatherford et al. | 364/200 |
| 4,675,806 A | | 6/1987 | Uchida | 364/200 |
| 4,701,844 A | | 10/1987 | Thompson et al. | 364/200 |
| 4,707,784 A | | 11/1987 | Ryan et al. | 364/200 |
| 4,713,752 A | | 12/1987 | Tone | 364/200 |
| 4,713,755 A | | 12/1987 | Worley, Jr. et al. | 395/375 |
| 4,719,568 A | | 1/1988 | Carrubba et al. | 364/200 |
| 4,740,889 A | | 4/1988 | Motersole et al. | 364/200 |
| 4,775,955 A | | 10/1988 | Liu | 395/425 |
| 4,989,140 A | | 1/1991 | Nishimukai et al. | 364/200 |

OTHER PUBLICATIONS

Computing Survey, vol. 14, No. 3, Sep. 3, 1982, pp. 473–530, A.J. Smith: *Cache Memories*.

Electronics International, vol. 55, No. 16, Aug. 1982, pp. 112–117, Per Knudsen: *Supermini Goes Microprocessor Route to Put it Up Front in Performance*.

Computer Design, vol. 24, No. 3, Mar. 1985, pp. 173–181, T. Fossum et al.: *New VAX Squeezes Mainframe Power Into Mini Package*.

"Compton 84", 28th IEEE Computer Society International Conference, digest of papers, *Intellectual Leverage The Driving Technologies*, Feb. 27, 1984, pp. 230–236, David Stevenson, Z80,000 32–Bit Microprocessor.

Microcomputer Hardware, *The Iwanami Microelectronics Course*, Nov. 1984, Japan, pp. 144–145.

*A Cache Memory for the NS16032 Virtual Memory Memory Processor*, R.S. Lim, 1984, IEEE, pp. 377–381.

* cited by examiner

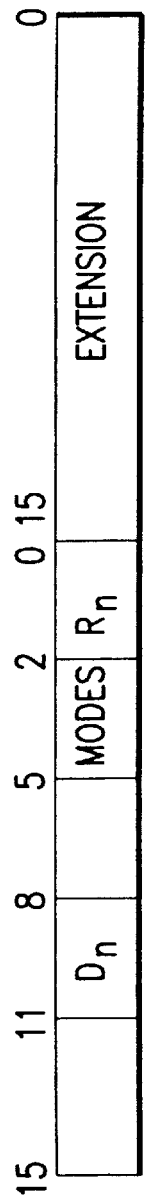

FIG. 3A

| 31 | 15 | 7 | 0 |
|---|---|---|---|
| 01001100111000 | 0 | 0 | PURGE CODE |

FIG. 3B

| PURGE CODE | PURGE DESIGNATION |
|---|---|
| 0 0 X X X X X X | RESERVED |
| 0 1 0 0 0 0 0 0 | DATA SYSTEM MEMORY |
| 1 0 0 0 0 0 0 0 | INSTRUCTION SYSTEM MEMORY |
| 1 1 1 1 1 1 1 1 | ALL PURGE |

X ··· DON'T CARE

| NO. | ADDRESS MODES | PROCESS |
|---|---|---|
| NO.1 | ADDRESS REGISTER INDIRECT | FETCH |
| NO.2 | ADDRESS REGISTER INDIRECT | FETCH |
| NO.3 | DATA REGISTER | ADD |
| NO.4 | ADDRESS REGISTER | STORE |
| NO.5 | ADDRESS REGISTER | JUMP TO NO.10 |
| NO.6 | | |
| NO.7 | | |
| NO.8 | | |
| NO.9 | | |
| NO.10 | DATA REGISTER | ADD |
| NO.11 | | |

FIG.13

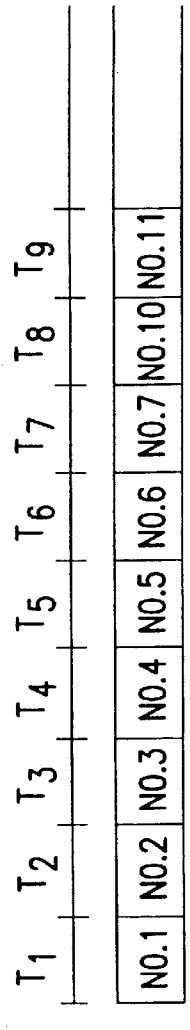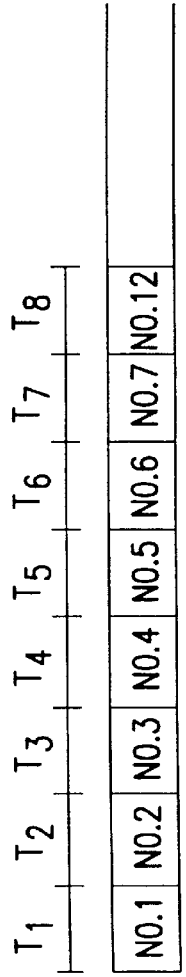
FIG.14A
FIG.14B

A data processor which can reduce conflict during access of an
DATA PROCESSOR CAPABLE OF EXECUTING AN INSTRUCTION THAT MAKES A CACHE MEMORY INEFFECTIVE

CROSS-REFERENCE TO RELATED APPLICATIONS

This is a division of application Ser. No. 09/396,414 filed Sep. 15, 1999, now U.S. Pat. No. 6,272,596, which is a continuation of application Ser. No. 09/113,550 filed Jul. 10, 1998, now U.S. Pat. No. 5,974,533 which is a continuation of application Ser. No. 08/886,464 filed Jul. 1, 1997, now U.S. Pat. No. 5,809,274, which is a continuation of application Ser. No. 07/978,069 filed Nov. 18, 1992, now U.S. Pat. No. 5,680,631, which is a continuation of application Ser. No. 07/596,752 filed Oct. 12, 1990 (abandoned), which is a continuation of application Ser. No. 07/238,260 filed Aug. 30, 1988 (abandoned), which is a division of application Ser. No. 06/840,433 filed Mar. 17, 1986 (abandoned).

BACKGROUND OF THE INVENTION

The present invention relates to a data processor capable of processing instructions at a high speed.

The data processor of the prior art comprises, as shown in FIG. 1, an interface circuit 7 for data transfer with a main memory 5, an instruction control unit 3 for controlling an instruction to be executed, and an instruction execution unit 4 for executing the instruction. When an instruction read out from the main memory 5 is transferred to an instruction control unit 3 via a line 73, the interface circuit 7 and a line 11, the instruction control unit 3 analyzes the instruction and transfers the result to the instruction execution unit 4 over a line 15. (It will be recognized that lines 73, 11 and 15 along with others to be described herein include more than one wire and are actually buses. Thus, the use of the term "line" herein includes both single conductors and multiple conductors.) As a result of the analysis, the instruction execution unit 4 generates a variety of control signals so that respective gates in the instruction execution unit 4 are opened or closed by those control signals to execute processing such as arithmetic operation, storage or shift. An instruction designates an address via lines 14 and 74 to read out data from the main memory 5 via lines 13 and 73 or write the arithmetic result in the main memory 5. The instruction control unit 3 designates the read address of a subsequent instruction in the main memory 5 via a line 12, the interface circuit 7 and the line 74. By repeating a series of those operations, data processor 1 executes the program which is stored in the main memory 5.

This processor of the prior art is equipped with a cache memory 71 to allow reading data from the main memory 5 at high speed. The cache memory 71 is addressed by the address on line 74 so that the data in the corresponding entry are read out but the main memory 5 is not accessed when the cache memory 71 is accessed. Consequently, when data are read out from the cache memory, accessing the main memory is unnecessary, so that reading out of data is much faster than it would be without said cache memory.

This processor is exemplified by the data processor which is disclosed on pages 144 to 148 of the *Iwanami Microelectronics Course*, Vol. 5, "Microcomputer Hardare", November, 1984.

In this processor, however, both the instruction control unit 3 and the instruction execution unit 4 use lines 73 and 74, and the cache memory 71 jointly when pipeline control is to be effected. To prevent conflict, therefore, a selector 72 may inhibit concurrent use so that one of the units is held on standby.

SUMMARY OF THE INVENTION

An object of the present invention is to provide a data processor which can reduce conflict during access of an instruction control unit and an instruction execution unit to a main memory so as to process instructions at a high speed.

The data processor of the present invention enables parallel operation of the instruction control unit 3 and the instruction execution unit 4 to effect pipeline control.

In order to eliminate the above-specified defects, according to the present invention, the instruction control unit and the instruction execution unit are equipped with associative memories, and first access the corresponding associative memory so that they do not use common address lines and data lines, before data are present, to access the main memory. Namely, the instruction control unit has a first associative memory storing instructions read out from the main memory, and an instruction controller which reads out an instruction from the first associative memory when the instruction is present in the first associative memory and from the main memory when the instruction is not present in the first associative memory. The instruction execution unit has a second associative memory storing operand data read out from the main memory, and an instruction executor for executing the instruction by using operand data read out from the second associative memory when operand data is present in the second associative memory and from the main memory when the operand data is not present in the second associative memory.

As a result, no conflict arises between the instruction control unit and the instruction execution unit when data are present in the associative memory of a least one of the two memories. This reduces the chance of one of the units being held on standby. As a result, the instructions can be processed more rapidly.

BRIEF DESCRIPTION OF THE DRAWINGS

FIGS. 2A and 2B are diagrams showing the instruction format used in the present invention.

FIGS. 3A and 3B are diagrams showing the format of the special instructions used in the present invention.

FIG. 13 is a diagram showing the instruction array to be executed by the processor of FIG. 4.

FIGS. 14A and 14B are time charts of when the instruction array shown in FIG. 13 is executed by the processor of the present invention.

DETAILED DESCRIPTION

Figure 1:
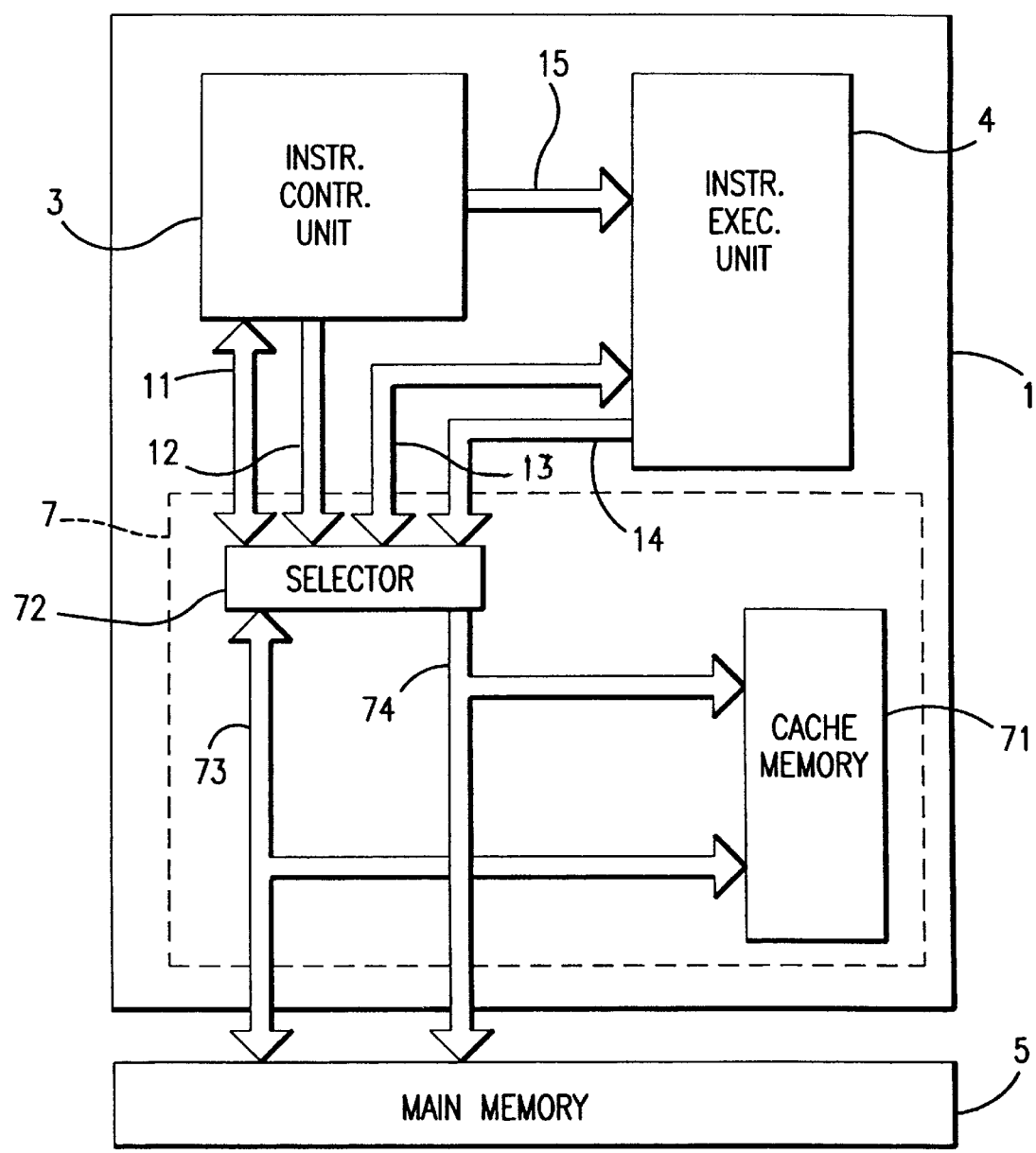
FIG. 1 is a circuit diagram showing the data processor of the prior art.

The present invention will be described in detail in connection with a specific embodiment thereof with reference to the accompanying drawings.

In the description to be made, the instructions to be used in the data processor of the present invention are first described, and the construction of the processor is then described, finally followed by the description of the operations.

A. Instructions

I. Basic Instruction Format

FIGS. 2A and 2B show the instruction format of the present invention. An instruction, which has a length of 32 bits, is composed of: type of arithmetic operation (bits 15 to 12); operation words (bits 11 to 0) for designating addressing modes; and an extension for data for address computations. Depending upon the addressing mode, the instruction may or may not be accompanied by the extension. Bits 11 to 9 (Dn) of the operation words indicate the numbers of data registers which hold data used as one arithmetic operand. The other operand is designated by bits 5 to 0 of the operation words. More specifically, bits 2 to 0 (Rn) indicate the numbers of registers to be referred to for those operands, whereas bits 5 to 3 (MODES) indicate the addressing modes.

The processor of the present invention is equipped with eight data registers and eight address registers, which will be described later.

The correspondence between patterns of bits 5 to 3 and the addressing modes are shown in FIG. 2B. In this Figure, the "data register" mode and the "address register" mode are those in which the contents of the respective data registers and address registers designated are used as the operands, as they are. The "address register indirect" mode is one in which the content of the address register designated is used as the memory address of the operand. The "post-increment" mode and the "pre-decrement" mode are basically identical to the address register indirect mode but are different therefrom in that the contents of these address registers are incremented by 1 and decremented by 1, respectively, immediately after and before the operands are stored or fetched. In these modes, therefore, the operand data stored in a series of addresses are consecutively read out and computed.

The "displaced address register indirect" mode is one in which the value obtained by adding the content of the extension part to the content of the designated address register is used as the memory address of the operand, whereas the "displaced program counter relative" mode is one in which the value obtained by adding the content of the extension part to the address of the instruction (or the content of the program counter) is used as the memory address of the operand. Moreover, the "absolute address" mode is one in which the content of the extension part is used, as it is, as the memory address of the operand.

II. Stack Instructions

Since the program of the present invention is written in a high level language, it has a stack as its data structure. Especially, when a subroutine is used, it is necessary to store, as different groups, the variables to be used in the main routine and the variables to be used in the subroutine. These groups are called frames.

The stack is composed of a part of the main memory and a stack pointer. This stack pointer is a register which stores an address for sequentially storing variables from a lower address in the main memory.

When a subroutine is called, the value of the stack pointer is transferred to a frame pointer. This frame pointer is a register which stores the highest address of one frame. Of the eight address registers, in the illustrated embodiment, one is used as the stack pointer whereas another is used as the frame pointer.

Access to the stack is executed by designating the frame pointer or the stack pointer in bits 2 to 0 of the instruction and by designating any of the "address register indirect", "post-increment", "pre-decrement" and "displaced address register indirect" modes as the addressing mode of bits 5 to 3 of the instruction. All of the modes of the accesses to the stack will be called a "stack access mode", and those instructions will be called "stack instructions."

Since the stack pointer is predetermined in one register in the present processor, as has been described above, the program which fails to designate that register as the stack pointer will not give optimum performance.

III. Control Instruction

Moreover, the data processor according to the present invention has a control instruction which has a format different from that of the aforementioned general instruction.

This instruction is a purge instruction, which is issued exclusively by the data processor itself. Despite this, the purge instruction may be read out along with the aforementioned basic instruction from the main memory. The purge instruction has a function built into the data processor which makes associative memories 21 and 31, or 36 and 37 of FIG. 4, to be described below, ineffective.

The reason why this instruction is present will be described in the following.

The data processor 1 of the present invention is formed on a single chip. External access is effected by generating an address on that chip. In the present system, however, the address on the chip and the address actually assigned to an external unit may be different; and the address in the data processor may be considered a logical address whereas the address actually assigned to the external unit may be considered a physical address. Generally, the transformation between the logical address and the physical address is accomplished by disposing a special piece of hardware called in "address transformation device" either in the output part inside of the chip of the data processor or outside of the same. This is disclosed on page 145 of the above-specified publication, for example.

Since the data processor of the present invention provides only the logical address on the chip, as will be described hereinafter, the address of the main memory which is a physical address and the address of the associative memory on the chip which is a logical address may be different in the case of a system having an address transformation device attached to the outside.

Especially when switching to address space above that in the main memory, correspondence between the address of the information held in the associative memory in the data processor 1 and the actual address of the main memory cannot be guaranteed.

The solution to this problem lies in the fact that the data processor issues a purge instruction in advance to make the internal associative memory ineffective.

As a result, when an address transformation device is disposed in the system, it has to inform the data processor, with a purge signal, of the fact that the address space has been switched.

The data processor of the present invention is designed to issue a purge instruction in response to a purge signal and a purge instruction from the address transformation device.

The description thus far has described the reason for providing the purge instruction.

Next, the format of the purge instruction will be described with reference to FIG. 3A.

In the purge instruction, the designation of the memory to have its content made ineffective depends upon a purge code. This correspondence is shown in FIG. 3B. The memory is not made ineffective when bits 7 and 6 of the purge code are "00." The associative memory of the data system is made ineffective when the purge code is "01000000." An associative memory 21 which will be described later corresponds to that of the data system.

The associative memory of the instruction system is made ineffective when the purge code is "10000000." Associative memories 31, 36, 37 and 38, which will be described later in connection with FIG. 4, correspond to those of the instruction system.

All the internal associative memories are made ineffective when the purge code is "11111111."

B. Construction of the Processor

Next, the construction of the processor of the present invention will be described in detail. Indicated at reference numeral 1 of FIG. 4 is a data processor which is composed of: an interface unit 2 for transferring data to and from the main memory 5; an instruction control unit 3 for analyzing the data from the interface unit 2; and an instruction execution unit 4 for executing analytical instruction from the instruction control unit 3.

Four bytes of data (32 bits) can be read out from the main memory 5 by a single access.

The instruction execution unit 4 reads out the data necessary for the instruction execution through the interface unit 2.

The instruction control unit 3 and the instruction execution unit 4 can be operated in parallel so that they are subjected to pipeline control.

The respective circuits will be described in the following.

I. Instruction Control Unit 3

The instruction control unit 3 has an instruction controller 300 and the associative memory 31. The instruction controller 300 includes an address generator 32, a control circuit 33 and a first-in-first-out memory 34. The address generator 32 is a circuit made receptive to a pre-fetch address renewal signal via a line 134 and a branch address via a line 133 to output a pre-fetch address and a fetch demand to a line 131 and the address of the instruction being executed in the instruction execution unit 4 to a line 132.

Figure 5:
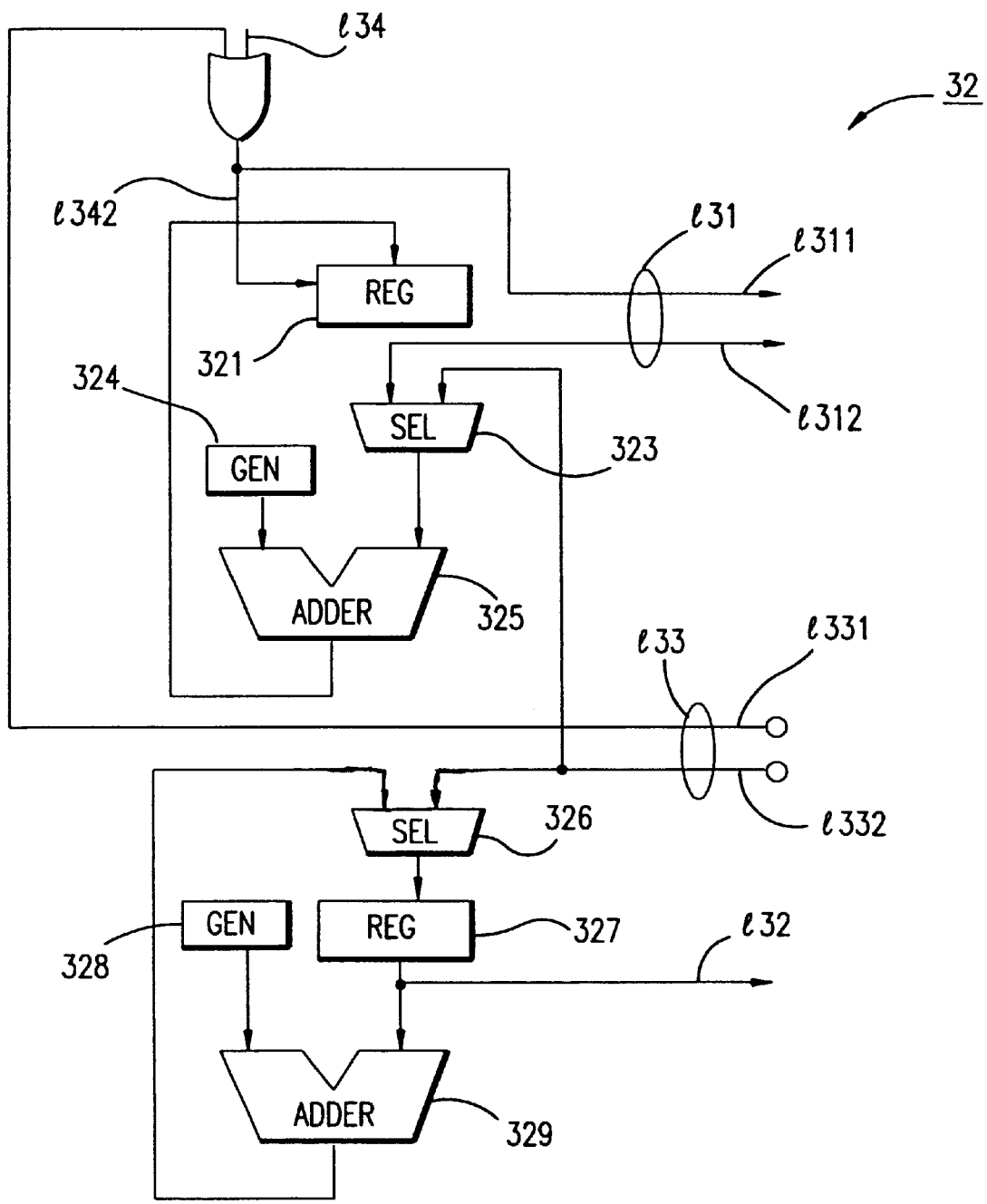
FIG. 5 is a diagram showing the construction of the address generator 32 used in FIG. 4.

FIG. 5 shows the detail of the address generator 32. Indicated at numeral 323 is a selector for selecting a pre-fetch address, normally from a register 321, and a branch address when the latter is given via a line 1332.

Indicated at numeral 325 is an adder for adding the number given from a constant generator 324 to the instruction address from the selector 323. The number generated by the constant generator 324 corresponds to the length of the instruction to be read out.

The register 321 latches the output of the adder 325 in response to a signal from a line 1342. As a result, the register 321 is updated each time it receives the signal from the line 134 so that the pre-fetch address is output on a line 12 of the line 131. The updated signal of the line 134 is output from line 1311 of line 131.

Indicated at numeral 326 is a selector which normally selects the output from an adder 329, but which selects the branch address when this address is applied via the line 1332. A register 327 latches an instruction address from the selector 326 to output it to the line 132.

The adder 329 adds the number from a constant generator 328 to the instruction address on the line 132. The number to be generated by the constant generator 328 corresponds to the length of the instruction to be executed.

Figure 4:
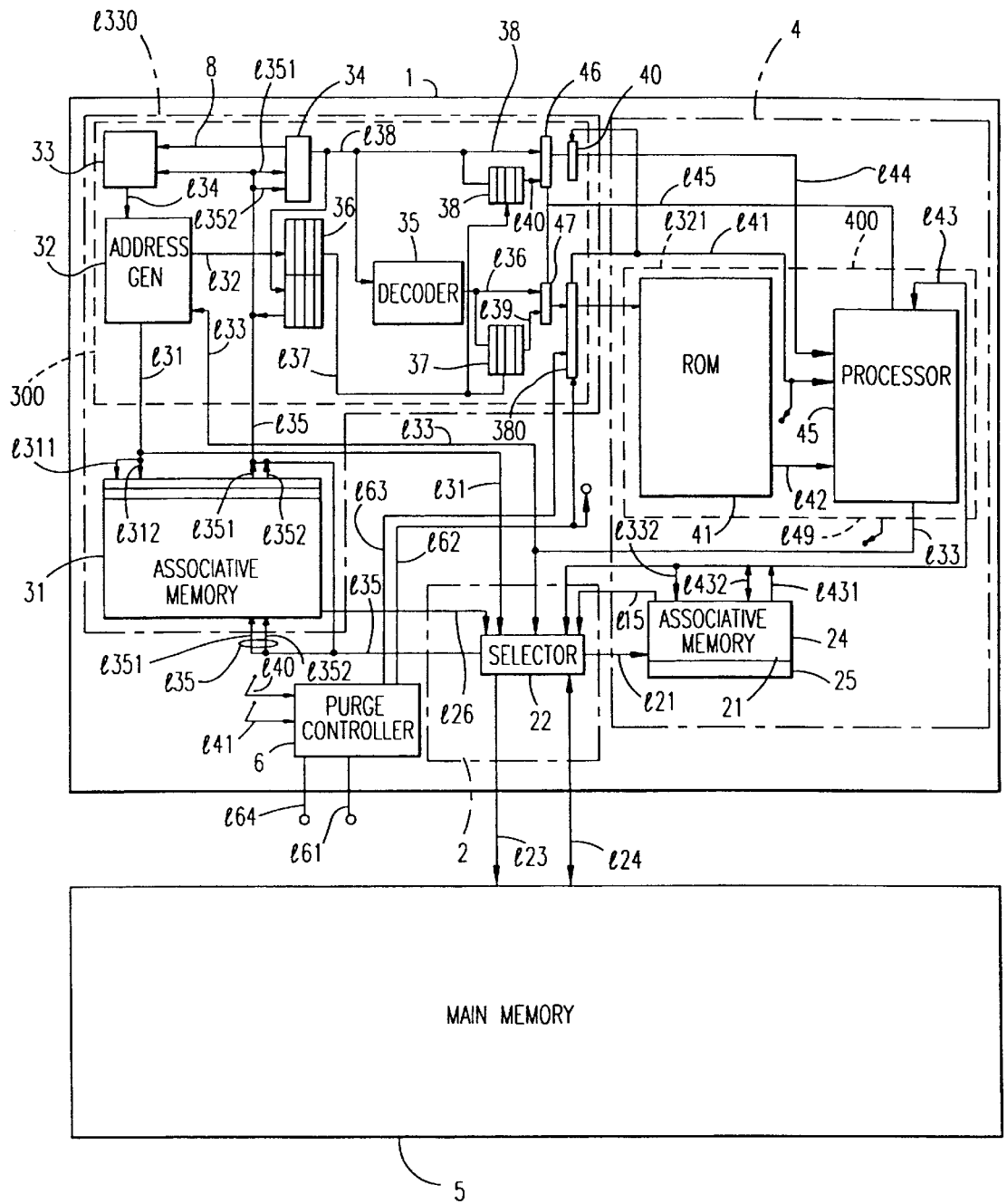
FIG. 4 is a diagram showing the construction of an embodiment of the present invention.

The associative memory 31 of FIG. 4 is for storing the instruction address and an instruction corresponding to the former in a common entry.

Figure 6:
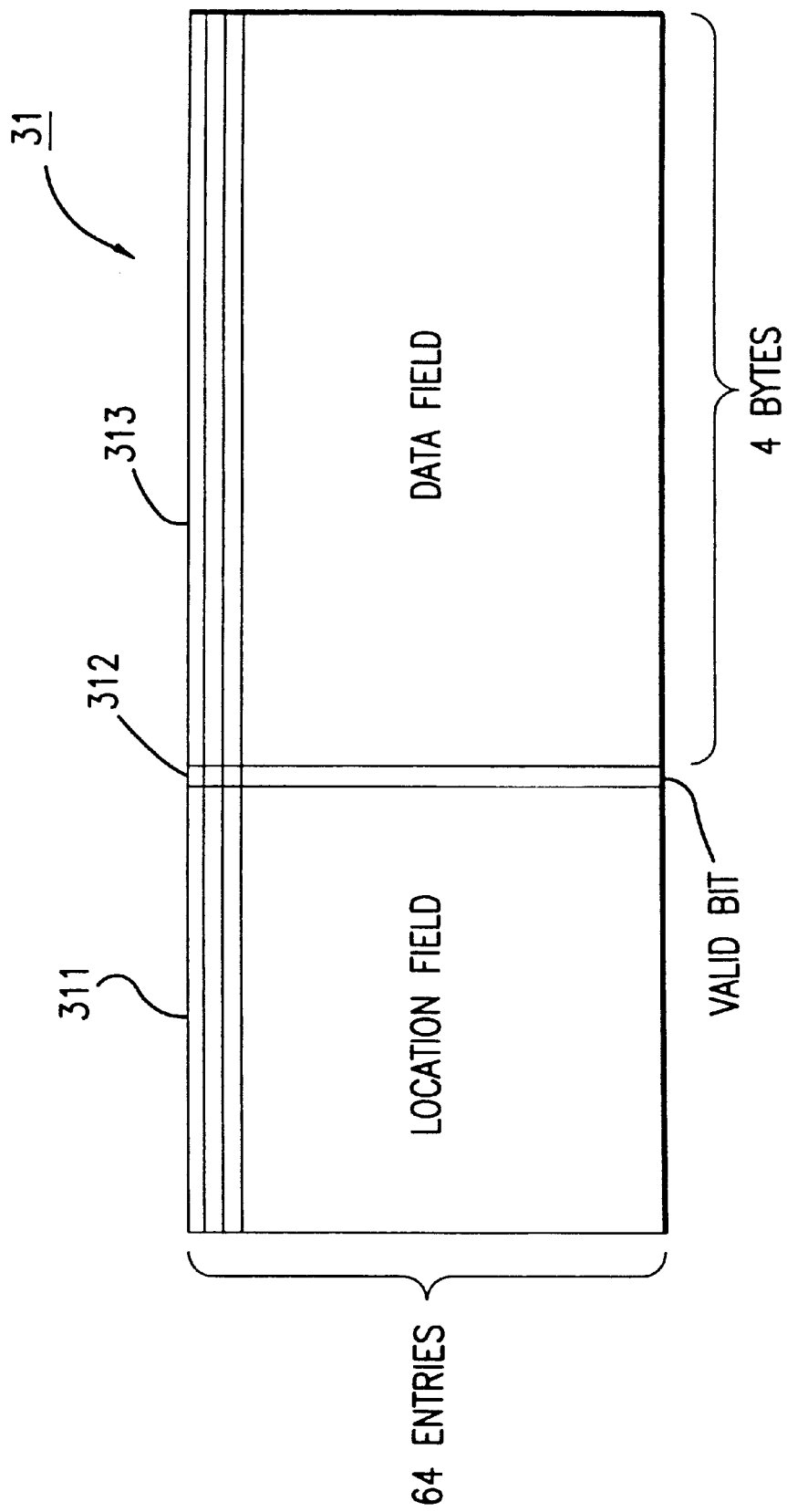
FIG. 6 is a diagram showing the construction of the associative memory 31 used in FIG. 4.

The construction of associative memory 31 is shown in FIG. 6. The associative memory 31 is constructed, in its entirety, of 64 entries each of which is composed of a location field 311, a valid bit 312 and a data field 313.

The location field 311 is for storing the instruction address given via line 1312. The valid bit is for indicating whether or not the data stored in the data field 313 are effective. The data field is for storing the instruction given via line 135 of FIG. 4 and has a length of 4 bytes (or 32 bits).

The address of the associative memory 31 is accomplished by the instruction address given via line 131. If the instruction address is present and the valid bit is set, the instruction stored in the data field of the corresponding entry is output to a line 1352. A fetch end signal is also output to a line 1351. When the associative memory 31 is accessed, the signal on line 126 is turned ON to inhibit access to the main memory by selector 22.

Updating of the associative memory 31 is effected when there is no entry stored with the instruction address from the line 131 and when the valid bit is reset. In that case, input read out when the fetch end signal of the line 1351 from the main memory 5 is turned ON is input via the line 135 and is written together with the instruction address from the line 131 in the oldest entry. The valid bit 312 of the newly written entry is set.

The associative memory 31 is made ineffective by executing the purge instruction. When this purge instruction is executed, the valid bit 312 is reset for all the entries by a signal line (not shown) from the instruction execution unit 4.

The first-in first-out memory 34 of FIG. 4 stores a plurality of instructions given via the line 1352 when the fetch end signal of the line 1315 is turned on. With this memory 134, reading out of the oldest instruction occurs first.

The control circuit 33 sends out a pre-fetch address renewal signal to the address generator 32 via the line 134 so as to read out a subsequent instruction when information that the memory 34 is vacant is received via the line 1330 and when the fetch end signal of the line 1351 is turned off.

A decoder 35 analyzes the instruction from the memory 34 and transforms it to the instruction address of the micro-program to output the same to a line 136.

Associative memories 36, 37 and 38 are buffers for suppressing disturbances on pipelines to store the branched address, the branched instruction and the decoded result in a common entry.

Figure 7:
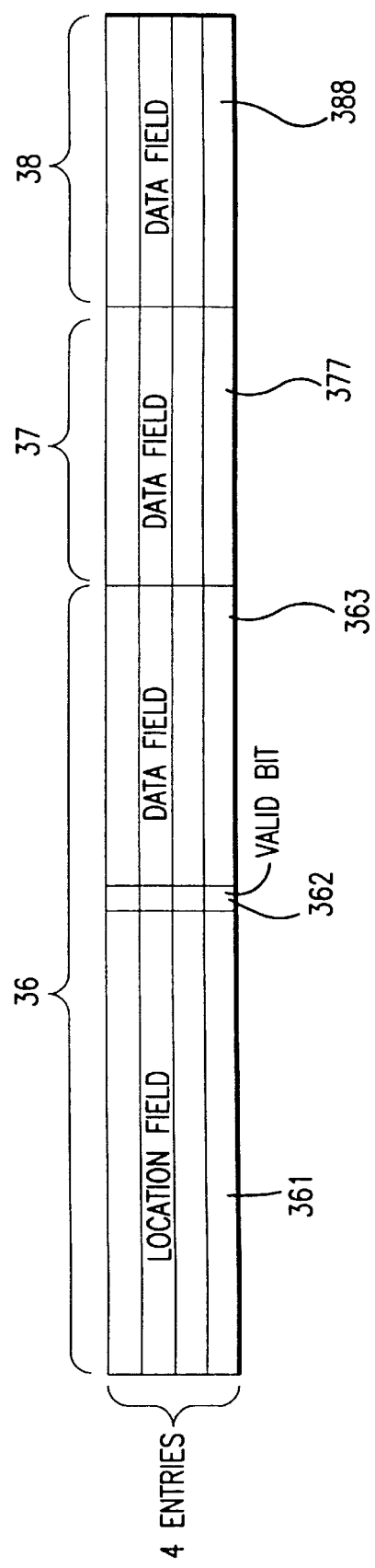
FIG. 7 is a diagram showing the construction of the associative memories 36, 37 and 38 used in FIG. 4.

The construction of the associative memories 36, 37 and 38 is shown in FIG. 7. These memories are constructed in their entirety of four entries, each of which is composed of a location field 361, a valid bit 362 and data fields 363, 377 and 388.

The location field 361 stores the branched address given via the line 132. The valid bit field 362 indicates whether the data stored in the data fields 363, 377 and 388 are effective. A part 363 of the data field stores the subsequent branched instruction given via a line 138. Another part 388 of the data field stores the branched instruction itself given via the line 138. Another part 377 of the data field stores the micro instruction address given via the line 136. In the overall construction view of FIG. 4, the associative memory 36 is connected between the address generator 32 and the address inputs of associative memories 37 and 38, and the associative memory 37 is connected between the decoder 35 and the instruction execution unit 4. This is because the locations of sources for the variety of information to be stored in the associative memory 36 are different from those of sources for the information to be stored in the associative memory 37. Due to the division of the associative memories 36 and 37, it is possible to shorten the distances between the information source and the associative memories and to reduce the area of the chip occupied by the lines between. The associative memories 36 and 37 are connected via a line 137, and the address of the entry selected at the associative memory 36 is given to the associative memories 37 and 38 via the line 137 so that the entry commonly shared between them is selected.

The locations to the associative memories 36, 37 and 38 are selected by the branched address given via the line 132. When the branched address is present and when the valid bit 362 is set, items of information stored in the data fields 363, 377 and 388 of the corresponding entry are output to line 135, 139 and 140, respectively.

Reloading of the associative memories 36, 37 and 38 is conducted when there is no entry stored with the branched address from the line 132 and when the valid bit 362 is reset. At this time, the branched address, the decoded result of the branched instruction, and the branched subsequent instruction are written together at the location of the oldest previous entry. The valid bit 362 of the entry newly written is set.

The associative memories 36, 37 and 38 are made ineffective when the purge instruction is executed. When this purge instruction is executed, the valid bit 362 is reset for all the entries by the signal line (not shown) from the instruction execution unit 4.

A selector 47 of FIG. 4 selects line 139 when it receives a branch success signal given via line 145. The selector 47 selects line 136 when it receives branch failure signal.

A selector 46 selects line 138 when it receives the branch success given via line 145. The selector 46 selects line 140 when it receives a branch failure signal.

A register 380 latches the micro instruction address from the decoder 35 or associative memory 37 coupled through selector 47 in response to a subsequent instruction demand signal given via line 141. The register 380 also sends out the latched micro instruction address to the instruction execution unit. However, the register 380 latches the purge instruction via line 163 rather than the micro instruction address from the selector 47 when it is given the purge instruction signal of a subsequent instruction demand signal of line 141 via line 162.

Register 40 latches the signal from the selector 46 when receives the subsequent instruction demand signal via line 141.

II. Instruction Execution Unit 4

The instruction execution unit 4 has an instruction executor 400 and an associative memory 21. The instruction executor 400 includes a ROM 41 and a processor 45. The ROM 41 sequentially takes as the addresses a series of respective micro instructions, which are given via line 1381 and arrayed on a time axis, to sequentially read out the control information stored at the corresponding addresses and to output it to line 142.

The processor 45 performs arithmethic operations on the basis of the control information on the line 142. The processor 45 outputs the address for obtaining the operand data from the main memory via line 133 and outputs the operand data read out via line 143. The processor 45 also inputs the instruction itself via line 144. The subsequent instruction demand signal is output to line 141 when the instruction execution ends. When a branch instruction is executed, moreover, the branch success signal is output to line 145 if the branch succeeds, whereas the branch failure signal is output if the branch fails.

Figure 8:
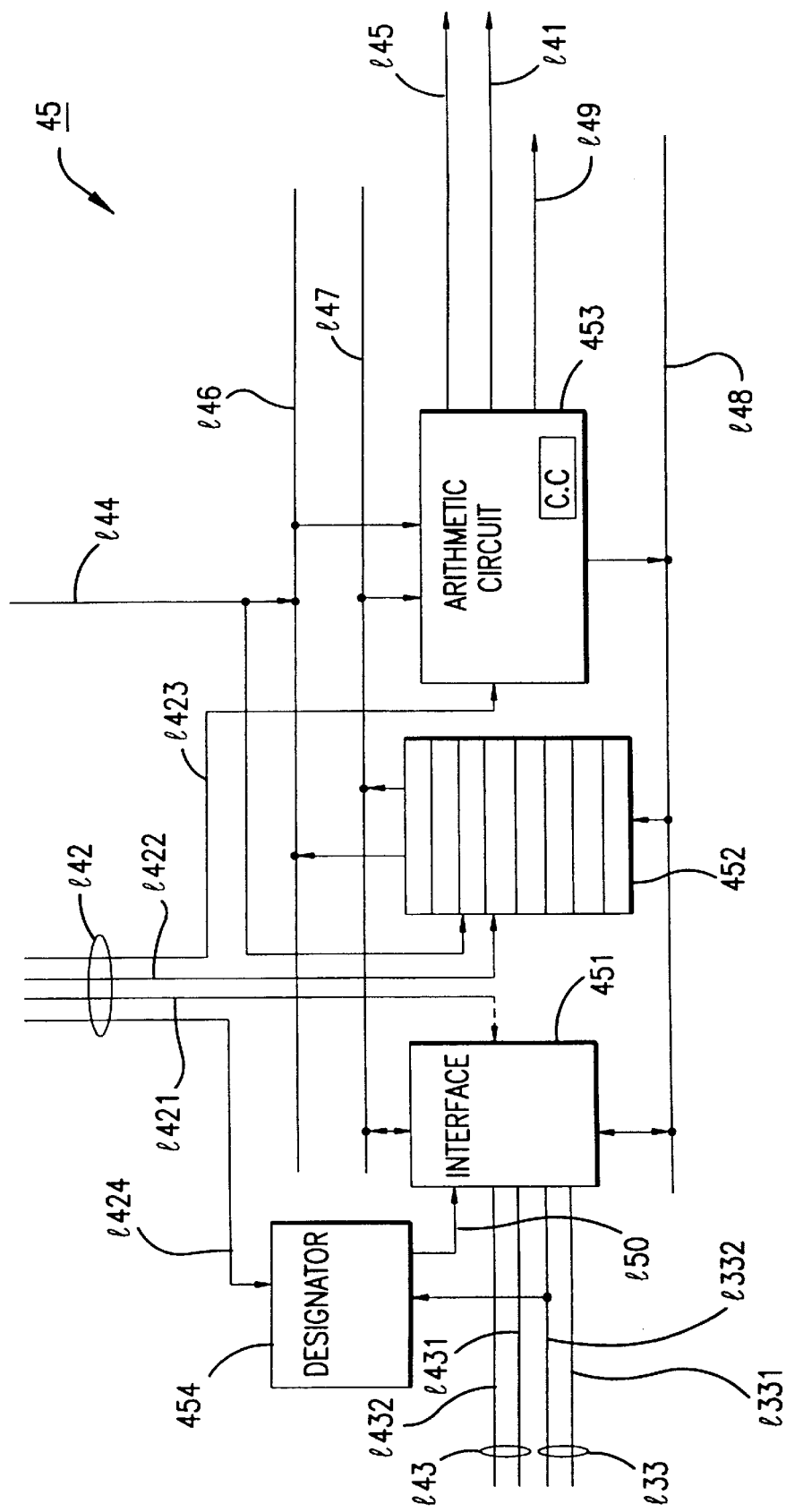
FIG. 8 is a diagram showing the construction of the processor 45 used in FIG. 4.

FIG. 8 is a diagram showing the construction of the processor 55. Lines 146, 147 and 148 are internal data buses. A group of registers 452 is composed of eight data registers and eight address registers. One or two registers from the group 452 are designated by a line 1422 to read out the data to the buses 146 and 147 or to read in the data from the bus 148.

The eight address registers contain a stack pointer and a frame pointer. The stack pointer is decremented by 1 each time it is used for storing data in the main memory and incremented by 1 each time it is used for reading out those data.

Indicated at numeral 453 is an arithmetic circuit for adding or subtracting the signals on the buses 146 and 147 in accordance with the instruction from a line 1423 to output the computed result to the internal data bus 148. The arithmetic circuit 453 also outputs the subsequent instruction demand signal to the line 141 after all the control information for one instruction has been input from line 142 and after the end of the computation.

Moreover, the arithmetic circuit 453 refers to a condition code C.C, when a branch instruction is executed, to output the branch success signal to line 145, when the condition specified by the branch instruction has been satisfied, and the branch failure signal when that condition is not satisfied.

When the purge instruction is executed, a purge clear signal is first output to a line 149 to reset the valid bit of the associative memory expressed by the purge code via the signal line (not shown).

Indicated at numeral 454 is a data designator for establishing the lower two bits of the address on line 133 on the basis of the operand size indicated on line 1424, in which 1, 2 or 4 bytes are designated by the instruction, when a post-increment mode and a pre-decrement mode is executed. It does this by providing interface 451 a signal via a line 150 to utilize those of the 32-bit data on the line 143, which are necessary as the operand and which have the length of the operand size.

The interface 451 outputs data from the line 1432 in accordance with the control information on the line 1421, when the fetch end signal of a line 1431 is turned on, to turn off the fetch demand signal on the line 1431. The interface 451 also outputs the data from the internal data buses 147 and 148 to the line 1432 and the fetch demand signal to the line 1431. When the bit location and the length of the data to be read out are designated on the line 150, the interface 451 cuts out the data on the basis of the designation.

Returning to FIG. 4, the associative memory 21 is composed of an operand buffer 24 for storing the operand data, and a line buffer 25 for storing the byte data.

Figure 9:
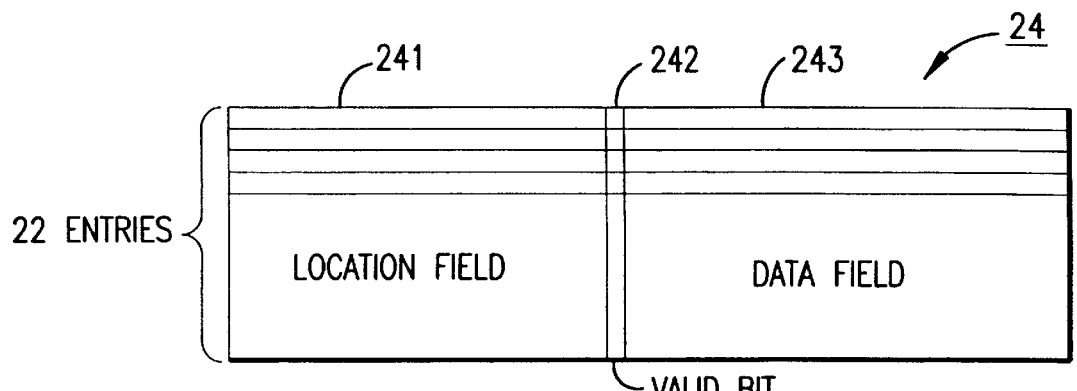
FIG. 9 is a diagram showing the construction of the operand buffer 24 used in FIG. 4.

The arrangement of the operand buffer 24 is shown in FIG. 9. The operand buffer 24 contains in its entirety 22 entries, each of which is composed of a location field 241, a valid bit 242 and a data field 243. The location field is for storing the addresses of the operand data given via the line 133. The valid bit 242 is for indicating whether or not the operand data stored in the data field are effective. The data field 243 is for storing the operand data given via line 121.

The updating and selection of the operand buffer 24 are subjected to the following two kinds of controls on the basis of the instructions to be executed in the instruction execution unit 4.

In the stack access mode and when the content of the address register designated by the instruction is output as the address of the operand data line 1332, the operand buffer 24 is located by said operand data address. When the operand data address is present and when the valid bit 242 is set, the operand data stored in the data field of the corresponding entry are output to the line 1432. At this time, the fetch end signal of the line 1431 is turned on. If the associative memory 24 is accessed, moreover, the access to main memory 5 is inhibited by the selector 22 via a line 125. If the operand buffer 24 does not contain the operand data address, the operand data read out from the main memory 5 are input via line 121 and are written together with the operand address from line 133 in the oldest previous entry. The effective bit 242 of the newly written entry is set.

When the instruction execution result is obtained so that it is output to line 143 along with the address of the main memory 5 where the execution result is output is to be stored, the operand buffer 24 is selected by that address. In case this address is present and when the valid but 242 is set, the data of the data field in the corresponding entry are rewritten to the execution result on line 1332. The valid bit 242 is set. Even if the associative memory is accessed at this time, no output is produced on the line 125. As a result, the selector 22 is not inhibited from accessing the main memory 5. If the operand buffer 24 does not contain the address, the data of the operand buffer 24 are not rewritten.

In cases other than the above-specified 1 and 2, the data in the operand buffer are not rewritten.

Example 1 is one which corresponds to the updating of the stack and the data read-out from the stack. Since, in example 2, an update and rewrite of the operand buffer are effected, the operand buffer can be said to be an internal memory for storing the stack data.

Since, in example 2, the stack may be subjected to direct address designation for rewriting the data, example 2 is processing for this.

The operand buffer 24 is made ineffective by the purge signal. The resetting is conducted for all the valid bits 242 when the purge signal is input.

The line buffer 25 of associative memory 21 is a memory for holding the 4 bytes of the sequential addresses, which all are read out together from the main memory 5 when the byte data of a length designated by the operand size is read out in the post-increment mode and in the pre-decrement mode, to speed up the access to the sequential operand addresses in the subsequent instructions.

Figure 10:
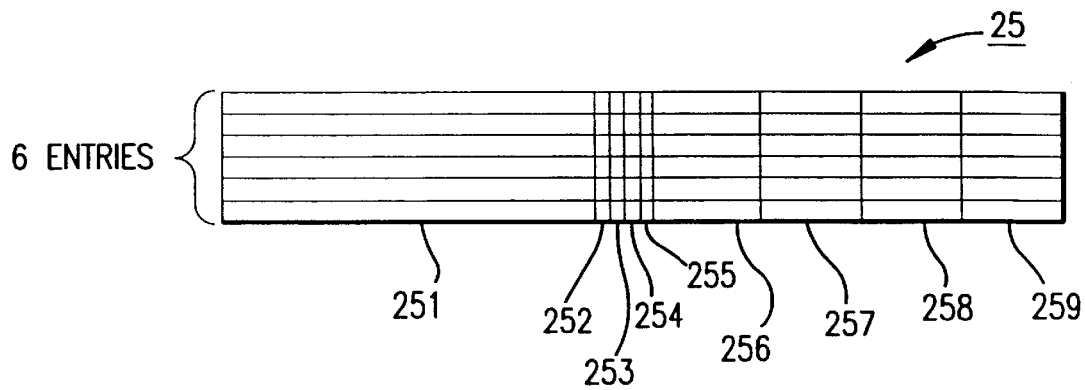
FIG. 10 is a diagram showing the line buffer 25 used in FIG. 4.

The arrangement of the line buffer 25 is shown in FIG. 10. The line buffer 25 has entries which correspond one to one to those six registers of the eight address registers of FIG. 8, other than the stack pointer and the frame pointer. Thus, the line buffer is constructed of six entries as a whole.

Each entry is composed of a location field 251, four valid bits 252 to 255, and four data fields 256 to 259. The valid bits 252 to 255 correspond to the data fields 256 to 259, respectively, and indicate whether or not the data of the corresponding data fields are effective. The four data fields of one entry are respectively stored with the data of 4 bytes of the sequential addresses read out all at once from the main memory 5.

The addresses of the line buffer 25 are selected in the post-increment mode and the pre-decrement mode of the address indirect modes.

The post-increment and pre-decrement modes are those in which the address register is incremented or decremented by 1 to sequentially read out the data stored in the sequential addresses.

When the first data are to be read out in this mode, it is usual that no corresponding entry is present even if the line buffer is selected. As a result, the address is sent out from processor 45 of FIG. 4 to the main memory via the line 133. At this time, 4 bytes of data are all read out together from the main memory 5 and are written in the entry corresponding to the address register designated by the instruction via the line 121. Simultaneously with this, the data are output from the selector 22 to the line 143.

At this time, the 32 bits of data are sent to the line 143, but the data necessary for the operand are those of such a number of bytes as is designated by the operand size. This data cutting is conducted by the aforementioned data designator 454 and interface 451 of FIG. 8.

When the first data processing is finished, the content of the address register designated by the instruction is incremented or decremented by 1, and the subsequent data are read out. Since, at this time, the address output to line 133 is the one succeeding the address output previously, the possibility of this address corresponding to the address in the data stored beforehand in the line buffer 25 is remarkably high. When a line buffer access results from this address, the data are not read out from the main memory 5, but the 4 bytes of data in the corresponding entry are output to line 143. Moreover, an output is fed to line 125 to inhibit access to the main memory 5 by the selector 22.

When the instruction execution result is obtained in the instruction execution unit 4 and output to line 143 so that the address of the main memory 5 to store said execution result is output to line 133, the line buffer 25 is selected by that address. If this address is present in line buffer 25, and its associated valid bit is set, the data of the data field in the corresponding entry are replaced with the execution result on line 133. The valid bit is set. Even if line buffer 25 is accessed at this time, no output is produced on the line 25. As a result, the selector 22 is not inhibited from accessing the main memory 5. If the line buffer 25 does not contain this address, the data are not rewritten in the line buffer 25. This operation is processing similar to that of the operand buffer for making the content of the line buffer coincident with that of the main memory 5.

By using the line buffer 25, as above, in the post-increment and pre-decrement modes, the access to the main memory may be conducted once for four bytes on an average so that a fast read-out can be conducted, especially in a case where the operand size is sufficient for processing of four sets of operand data.

III. Interface Unit 2

The interface unit 2 includes a selector 22. The selector 22 sends out either the instruction address given via line 131 or the operand data address given via line 133 to the main memory 5 via line 123.

Figure 11:
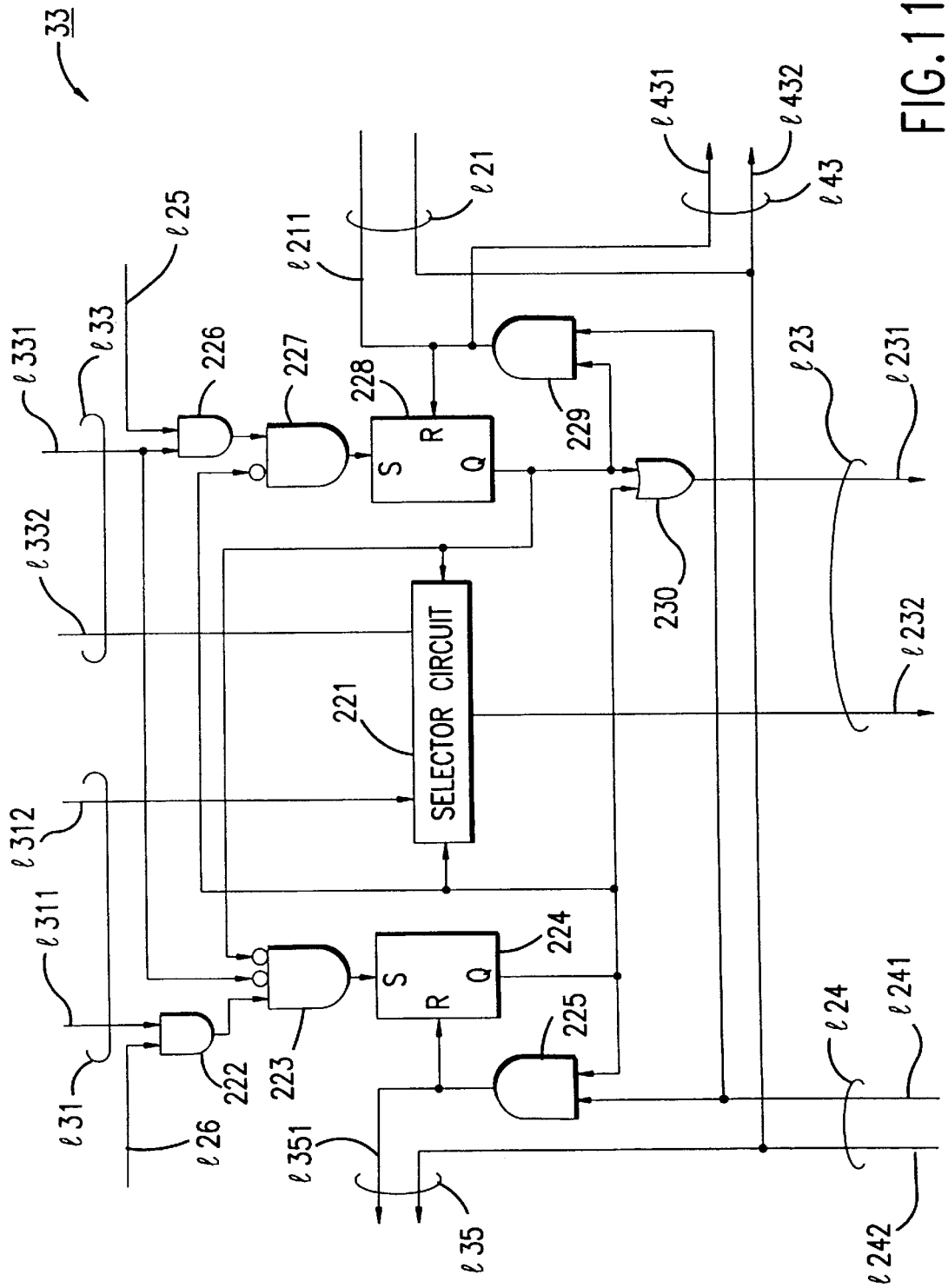
FIG. 11 is a diagram showing the construction of the selector 22 used in FIG. 4.

FIG. 11 is a diagram showing the construction of the selector 22. Line 1311 corresponds to the read demand signal whereas line 1312 corresponds to the address signal, and these two lines combined make up the line 131. Line 1331 carries a fetch demand signal whereas line 1332 carries the address signal, and these together make up the line 133. An AND circuit 222 determines the logical product of the signals on the lines 1311 and 126 to output a signal to inhibit access to the main memory 5 from the instruction control unit 3 when the associative memory 31 is accessed. An AND circuit 226 determines the logical product of the signals on the lines 1331 and 125 to output a signal for inhibiting access to the main memory 5 from the instruction execution unit 4 when the associative memory 21 is accessed.

AND circuits 223 and 227 are for making the access demand from the instruction execution unit 4 predominant. Either a flip-flop 224 or 228 is set by a respective AND circuit 323 or 227. A selector circuit 221 outputs one address signal, selected by an output from the flip-flop 224 or the flip-flop 228 to line 1232.

An OR circuit 230 determines the logical sum of the outputs of the flip-flops 224 and 228 to output a fetch demand signal to line 1231. This line 1231, together with line 1232 makes up line 123.

The data from the main memory 5 are obtained via a line 124. Line 1241 produces a fetch (or read) end signal to announce that the data have been prepared. The data themselves are input to line 1242.

AND circuits 225 and 229 judge which of the instruction control unit 3 and the instruction execution unit 4 has produced a fetch demand to line 1231 to inform line 1351 or 1211, having sent the demand of the fact that the data are prepared by the fetch end signal. The instruction control unit 3 and the instruction execution unit 4 examines line 1351 in line 135 and line 1211 in line 121 to determine whether response has been made to the fetch demand, thereby to turn off the fetch demand. The interface unit 2 also includes transformation device 222 for transforming logical addresses to physical addresses for use in main memory 5.

IV. Purge Controller 6

When the purge signal is input from line 161, the purge controller 6 outputs the purge instruction signal to line 162 and the purge instruction to line 163.

Figure 12:
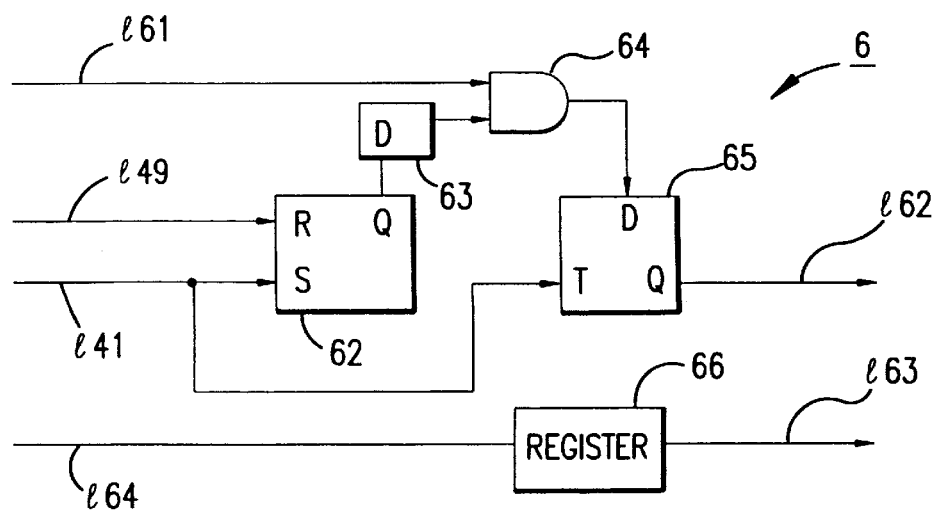
FIG. 12 is a diagram showing the purge controller 6 in FIG. 4.

The construction of the purge controller 6 is shown in FIG. 12.

When the purge signal is input from line 161, the D terminal of a flip-flop 65 is raised to a high level through an AND circuit 64. When a subsequent instruction demand signal is input through line 141, the input of the D terminal is latched at that time to turn on the purge instruction signal of line 162. As a result, the content of a register 66 stored in advance with the purge instruction via line 164 is latched in the register 380, as shown in FIG. 4, via line 163. At this time, moreover, a flip-flop 62 is set. When the purge instruction is executed at the instruction execution unit 4, the purge clear signal is first output to line 49. As a result, the flip-flop 62 is reset. The D input of the flip-flop 65 is set at a low level through a delay circuit 63 and the AND circuit 64. When the execution of the purge instruction is ended, the subsequent instruction demand signal of line 141 is turned on. As a result, the flip-flop 62 is set, and the flip-flop 65 is reset. The output of the flip-flop 62 is the input to the delay circuit 63. During this time, the register 380 latches the instructions decoded result from the selector 47. After this, the output from the delay circuit 63 goes high. While line 161 outputs the purge signal, the D input of the flip-flop 65 is high. As a result, when the subsequent instruction demand signal is input, the purge instruction signal is output again to line 162.

An address transformer (not shown) can be connected with lines 161 and 163.

The address transformer is used, as has been described hereinbefore, in the system in which the address to be used in the data processor and the address to be given to the system other than the data processor are different.

Incidentally, in the illustrated embodiment, the purge instruction can be latched alternately in register 380. This is because the usual instruction is executed step by step by the data processor to check the program.

C. Operation

Next, the operations of the data processor of the present invention will be described in the following.

FIG. 13 shows one example of the instruction array to be executed in the data processor of the present invention.

The instructions are stored from No. 1 to No. 11 in sequential addresses in the main memory.

Instructions Nos. 1 and 2 store the data of addresses indicated by the stack pointer in the data registers designated by the respective instructions.

Instruction No. 3 adds the contents of the respective registers stored with the data in accordance with instructions Nos. 1 and 2 and stores the result in either of the data registers.

Instruction No. 4 stores the content of the data register designated by the instruction in the address indicated by the address register designated by the instruction.

Instruction No. 5 jumps to the instruction of the address indicated by the address register designated by the instruction. In the case of the present example, the jump to instruction No. 10 is conducted.

Instruction No. 10 adds the contents of the two data registers designated by the instruction.

The time chart of when the aforementioned instruction array is executed is shown in FIG. 14A.

I. Cycle $T_1$

The address generator 32 outputs the address of the instruction No. 1 to line 131. The associative memory 31 is selected by this address and the address generator 32 reads the data from the main memory 5 when an attempt to access the associative memory 31 fails. The data read out from the main memory 5 are stored not only in the associative memory 31 but also in the memory 34.

II. Cycle $T_2$

Since the memory 34 is vacant, the address generator 32 outputs the address of instruction No. 2. The associative memory 31 is selected by this address as with the previous instruction No. 1 and the address generator 32 writes the data from the main memory 5 when an attempt to access the associative memory 31 fails. Moreover, the read data are stored in the memory 34.

The decoder 35 analyzes instruction No. 1 from the memory 34 to store the analyzed result in register 380.

The micro instruction array of instruction No. 1 stored in register 380 begins execution in the instruction execution unit 4.

Upon execution, the addresses of the operand data for storage in the data register are output to line 133. However, since this instruction is a stack instruction, there is a strong possiblity that the corresponding entry is present in associative memory 21. As a result, there is little conflict between the read demand of instruction No. 2 from the instruction control unit 3 and the read demand of the operand data from the instruction executing unit 4.

If instruction No. 2 is present in the associative memory 31, the read demands of instruction control unit 3 and instruction execution unit 4 from the main memory 5 do not conflict despite the fact that the operand data are present in associative memory 21.

III. Cycle $T_3$

Instruction No. 3 is read out from the main memory 5 like the instructions Nos. 1 and 2 and is stored in the memory 34. In the decoder 35, the analysis of instruction No. 2 is conducted.

In instruction execution unit 4, the execution of instruction No. 1 is ended, and the execution of instruction No. 2 is started.

Instruction No. 2 is a stack instruction like No. 1 to effect the location of the associative memory 21 thereby to read out the operand data from main memory 5 if the address is not present in the associative memory. The conflict between instruction control unit 3 and instruction execution unit 4 in this case is similar to that for instruction No. 1.

IV. Cycle $T_4$

Like instruction No. 1, instruction No. 4 is read out from the main memory 5 and is stored in the memory 34. In the decoder 35, the analysis of the instruction No. 3 is conducted. In instruction execution unit 4, the execution of instruction No. 2 is ended, and the execution of instruction No. 3 is started. Since instruction No. 3 performs arithmetic operations using the data register in instruction execution unit 4, operand data are not read out from the main memory 5.

V. Cycle $T_5$

Instruction No. 5 is read out like instruction No. 1 from the main memory 5 and is stored in the memory 34. In the decoder 35, the analysis of instruction No. 4 is conducted. In instruction execution unit 4, the execution of instruction No. 3 is ended, and the execution of instruction No. 4 is started. Instruction No. 4 is for writing the data of the data register in the main memory. The destination address at which the data are to be written is output to line 133. When the operand buffer 24 checks to determine whether the present address rewrites the content of the stack and finds that the content is to be rewritten, its content is rewritten to the data on the line 143. The data on the line 143 are set out to the main memory 5.

VI. Cycle $T_6$

Instruction No. 6 is read out from the main memory 5 like instruction No. 1 and is stored in the memory 34. In the decoder 35, the analysis of the instruction No. 5 is conducted. The address generator 36 outputs to line 132 the address of instruction No. 5 being executed by the instruction execution unit. Associative memory 36 is selected by this address. When no corresponding entry is present, no output is produced from associative memories 37 and 38. When the corresponding entry is present, the timing follows Cycles 10 and later, as will be described hereinafter. In the instruction execution unit 4, the execution of instruction No. 4 is ended, and the execution of the instruction No. 5 is started.

VII. Cycle $T_7$

Instruction No. 7 is read out from the main memory 5 like instruction No. 1 and is stored in memory 34. In the decoder 35, the analysis of instruction No. 6 is conducted. In instruction execution unit 4, the execution of the instruction No. 5 is ended, and the address of the instruction No. 10 to be subsequently executed is output to line 133. Since the branch has succeeded, moreover, instruction execution unit 4 clears the content of memory 34.

VIII. Cycle $T_8$

Address generator 32 takes the address of instruction No. 10 on line 133 and outputs it to line 131. Instruction No. 10 is stored in memory like instruction No. 1. In the decoder 35, no operation is conducted because the content of memory 34 has been cleared at the Cycle $T_7$. Nor is operation conducted in instruction execution unit 4, because the instruction to be executed has not been decoded. Instruction No. 10 itself is stored in associative memory 38.

IX. Cycle $T_9$

Instruction No. 11 is read out from main memory 5 like instruction No. 1 and is stored in memory 34. In the decoder 35, the analysis of instruction No. 10 is conducted. The analyzed result is stored in associative memory 37. Moreover, instruction No. 11 itself is stored in associative memory 36. At this time, the address of instruction No. 5 which has been executed last in instruction execution unit 4 is stored in associative memory 36. As a result, the common entry is stored with the branched address, the branched instruction, the branched instruction analyzed result, and the branched subsequent instruction. In instruction execution unit 4, the execution of the instruction No. 10 is conducted after the end of its analysis.

X. Cycle $T_7$.

If an entry corresponding to the associative memory 36 is present at Cycle $T_6$, as shown in FIG. 14B, the instruction per se is instantly read out from associative memories 37 and 38 as an analyzed result from instruction No. 10. From associative memory 36, moreover, instruction No. 11 is also read out and is stored in memory 34. At Cycle $T_7$, address generator 32 adds the length of instructions Nos. 10 and 11 to the address of instruction No. 10 given via line 133 to prepare the address of instruction No. 12 and output the same to line 131. Instruction No. 12 thus read out is stored in memory 34. In the decoder 35, the analysis of instruction No. 11 is conducted. Instruction execution unit 4 executes instruction No. 10 read out from the associative memories 37 and 38 immediately after the end of execution of the instruction No. 5.

As has been already described, according to the present invention, even if the instruction control unit and the instruction execution unit operate in parallel, a conflict in reading out data from the main memory is unlikely to occur, so that instruction processing can be speeded up.

What is claimed is:

1. A data processor comprising:

an instruction address generator;

a cache memory having entries each storing an instruction address and instruction corresponding to the instruction address; and an instruction decoder decoding an instruction from said cache memory or another memory corresponding to an instruction address from said instruction address generator;

wherein entries in said cache memory are selected to be made ineffective in response to an output signal of the instruction decoder;

wherein the data processor is formed on an LSI chip, and said cache memory is formed on the chip.

2. A data processor according to claim 1, wherein said cache memory is an associative memory.

3. A data processor formed on an LSI chip comprising:

an address generator;

a cache memory having first entries each storing an instruction address and an instruction corresponding to the instruction address;

an instruction decoder decoding an instruction from said cache memory or another memory corresponding to an instruction address generated by said instruction address generator; and an address transformation circuit transforming a logical address generated by said address generator to a physical address, wherein when the data processor executes a first instruction, the first entries are made ineffective.

4. A data processor formed on an LSI chip according to claim 3, further comprising:

an operand address generator generating an operand address in response to an output signal of said instruction decoder, wherein said cache memory has an instruction cache memory including the first entries and an operand cache memory including second entries, wherein each of the second entries stores an operand address and an operand data corresponding to the operand address in its entry, wherein when the data processor executes the first instruction, the second entries are made ineffective.

5. A data processor formed on an LSI chip according to claim 4, further comprising:
an execution unit executing an instruction based on the decoded result at said instruction decoder,
wherein said instruction decoder and said execution unit can be operated in parallel.

6. A data processor formed on an LSI chip according to claim 5, further comprising:
a ROM storing a control information corresponding to an instruction,
wherein said ROM outputs the control information corresponding to an instruction output from said instruction cache memory.

7. A data processor formed on an LSI chip according to claim 5,
wherein said execution unit has an arithmetic circuit, the arithmetic circuit computing an operand data and outputting the computed result.

8. A data processor formed on an LSI chip according to claim 5,
wherein each of the first entries and the second entries has a valid bit, and
wherein when said data processor executes the first instruction, the valid bits are cleared.

9. A data processor formed on an LSI chip according to claim 8,
wherein said cache memory is an associative memory.

10. A data processor formed on an LSI chip according to claim 4,
wherein said cache memory is an associative memory.

11. A data processor formed on an LSI chip according to claim 4,
wherein each of the first entries and the second entries has a valid bit, and
wherein when said data processor executes the first instruction, the valid bits are cleared.

12. A data processor formed on an LSI chip according to claim 4,
wherein the first instruction has a purge code, and
wherein when the data processor executes the first instruction, the data processor selects the first entries or/and the second entries according to the purge code and makes the selected entries ineffective.

13. A data processor formed on an LSI chip according to claim 3, further comprising:
a purge control unit;
wherein said purge control unit outputs the first instruction when the purge signal is input into said purge control unit.

14. A data processor formed on an LSI chip according to claim 3,
wherein the address transformation circuit is connected to the output part inside of the LSI chip.

15. A data processor formed on an LSI chip comprising:
an instruction address generator;
an instruction cache memory having entries each storing an instruction address and an instruction corresponding to the instruction address;
an instruction decoder decoding an instruction from said cache memory corresponding to an instruction address from said instruction address generator;
an operand address generator generating an operand address in response to an output signal of said instruction decoder;
an operand cache memory having entries each storing an operand address and operand data corresponding to the operand address in its entry,
wherein the data processor executes an instruction that makes entries in both of said instruction cache memory and said operand cache memory ineffective.

16. A data processor formed on an LSI chip according to claim 15, further comprising:
an execution unit executing an instruction based on the decoded result at said instruction decoder,
wherein said instruction decoder and said execution unit can be operated in parallel.

17. A data processor formed on an LSI chip according to claim 16, further comprising:
a ROM storing a control information corresponding to an instruction,
wherein said ROM outputs the control information corresponding to an instruction output from said instruction cache memory.

18. A data processor formed on an LSI chip according to claim 16,
wherein said execution unit has an arithmetic circuit, the arithmetic circuit computing an operand data and outputting the computed result.

19. A data processor formed on an LSI chip according to claim 16,
wherein each of entries in said instruction cache memory and said operand cache memory has a valid bit, and
wherein when said data processor executes the instruction that makes entries in both of said instruction cache memory and said operand cache memory ineffective, the valid bits of said instruction cache memory and said operand cache memory are cleared.

20. A data processor formed on an LSI chip according to claim 16,
wherein each of said instruction cache memory and said operand cache memory is an associative memory.

21. A data processor formed on an LSI chip according to claim 15,
wherein each of said instruction cache memory and said operand cache memory is an associative memory.

22. A data processor formed on an LSI chip according to claim 15,
wherein each of entries in said instruction cache memory and said operand cache memory has a valid bit, and
wherein when said data processor executes the instruction that makes entries in both of said instruction cache memory and said operand cache memory ineffective, the valid bits of said instruction cache memory and said operand cache memory are cleared.

23. A data processor formed on an LSI chip according to claim 15, further comprising:
a purge control unit;
wherein said purge control unit outputs the instruction that makes entries in both of said instruction cache memory and said operand cache memory ineffective when the purge signal is input into said purge control unit.

24. A data processor formed on an LSI chip according to claim 15, further comprising:
an address transformation circuit transforming a logical address generated by said address generator to a physical address,
wherein the address transformation circuit is connected to the output part inside of the LSI chip.

25. A data processor formed on an LSI chip comprising:
an instruction cache memory storing an instruction address and an instruction corresponding to the instruction address;
an instruction decoder decoding an instruction from said cache memory or another memory;
an operand cache memory storing an operand address and operand data corresponding to the operand address,
wherein the instruction and operand cache memories are flushed by executing a first instruction.

26. A data processor formed on an LSI chip according to claim 25, further comprising:
an execution unit executing an instruction based on the decoded result at said instruction decoder,
wherein said instruction decoder and said execution unit can be operated in parallel.

27. A data processor formed on an LSI chip according to claim 26, further comprising:
a ROM storing a control information corresponding to an instruction,
wherein said ROM outputs the control information corresponding to an instruction output from said instruction cache memory.

28. A data processor formed on an LSI chip according to claim 26,
wherein said execution unit has an arithmetic circuit, the arithmetic circuit computing an operand data and outputting the computed result.

29. A data processor formed on an LSI chip according to claim 26,
wherein said instruction cache memory and said operand cache memory has a valid bit, and
wherein when said data processor executes the first instruction, the valid bits of said instruction cache memory and said operand cache memory are cleared.

30. A data processor formed on an LSI chip according to claim 26,
wherein each of said instruction cache memory and said operand cache memory is an associative memory.

31. A data processor formed on an LSI chip according to claim 25,
wherein each of said instruction cache memory and said operand cache memory is an associative memory.

32. A data processor formed on an LSI chip according to claim 25,
wherein said instruction cache memory and said operand cache memory has a valid bit, and
wherein when said data processor executes the first instruction, the valid bits of said instruction cache memory and said operand cache memory are cleared.

33. A data processor formed on an LSI chip according to claim 25, further comprising:
a purge control unit;
wherein said purge control unit outputs the first instruction when the purge signal is input into said purge control unit.

34. A data processor formed on an LSI chip according to claim 25, further comprising:
an address transformation circuit transforming a logical address generated by said address generator to a physical address,
wherein the address transformation circuit is connected to the output part inside of the LSI chip.

35. A data processor formed on an LSI chip according to claim 25,
wherein said instruction cache has first entries, each of the first entries stores an instruction address and an instruction corresponding to the instruction address,
wherein said instruction cache has second entries, each of the second entries stores an operand address and operand data corresponding to the operand address,
wherein the first and second entries are flushed by said data processor when said data processor executes the first instruction.

36. A data processor formed on an LSI chip comprising:
an instruction cache memory having entries each storing an instruction address and an instruction corresponding to the instruction address;
an instruction decoder decoding an instruction from said instruction cache memory;
an operand address generator generating an operand address corresponding to a decoded result at the instruction decoder;
an operand cache memory having entries each storing an operand address and operand data corresponding to the operand address;
wherein the data processor invalidates the instruction and operand cache memories when the processor executes a first instruction.

37. A data processor formed on an LSI chip according to claim 36, further comprising:
an execution unit executing an instruction based on the decoded result at said instruction decoder,
wherein said instruction decoder and said execution unit can be operated in parallel.

38. A data processor formed on an LSI chip according to claim 37, further comprising:
a ROM storing a control information corresponding to an instruction,
wherein said ROM outputs the control information corresponding to an instruction output from said instruction cache memory.

39. A data processor formed on an LSI chip according to claim 37,
wherein said execution unit has an arithmetic circuit, the arithmetic circuit computing an operand data and outputting the computed result.

40. A data processor formed on an LSI chip according to claim 37,
wherein each of entries in said instruction cache memory and said operand cache memory has a valid bit, and
wherein when said data processor executes the first instruction, the valid bits of said instruction cache memory and said operand cache memory are cleared.

41. A data processor formed on an LSI chip according to claim 37,
wherein each of said instruction cache memory and said operand cache memory are an associative memory.

42. A data processor formed on an LSI chip according to claim 36,
wherein each of said instruction cache memory and said operand cache memory are an associative memory.

43. A data processor formed on an LSI chip according to claim 36,
wherein each of entries in said instruction cache memory and said operand cache memory has a valid bit, and
wherein when said data processor executes the first instruction, the valid bits of said instruction cache memory and said operand cache memory are cleared.

44. A data processor formed on an LSI chip according to claim 36, further comprising:
a purge control unit;
wherein said purge control unit outputs the first instruction when the purge signal is input into said purge control unit.

45. A data processor formed on an LSI chip according to claim 36, further comprising:
an address transformation circuit transforming a logical address generated by said address generator to a physical address,
wherein the address transformation circuit is connected to the output part inside of the LSI chip.

46. A data processor formed on an LSI chip comprising:
an address generator;
a cache memory;
an instruction decoder; and
an address transformation circuit,
wherein said address generator outputs an instruction address,
wherein said cache memory has first entries each storing an instruction address and an instruction corresponding to the instruction address,
wherein said instruction decoder decodes an instruction from said cache memory or another memory corresponding to the instruction address from said instruction address generator,
wherein said address transformation circuit is input a logical address generated by said address generator and outputs a physical address corresponding to the logical address, and
wherein said instruction and operand cache memory are invalidated by executing a first instruction.

47. A data processor formed on an LSI chip according to claim 46, further comprising:
an operand address generator,
wherein said operand address generator generates an operand address in response to an output signal of said instruction decoder,
wherein said cache memory has an instruction cache memory including the first entries and an operand cache memory including second entries,
wherein each of the second entries stores an operand address and an operand data corresponding to the operand address in its entry,
wherein when the data processor executes the first instruction, the second entries are made ineffective.

48. data processor formed on an LSI chip according to claim 47, further comprising:
an execution unit executing an instruction based on the decoded result at said instruction decoder,
wherein said instruction decoder and said execution unit can be operated in parallel.

49. data processor formed on an LSI chip according to claim 48, further comprising:
a ROM storing a control information corresponding to an instruction,
wherein said ROM outputs the control information corresponding to an instruction output from said instruction cache memory.

50. A data processor formed on an LSI chip according to claim 48,
wherein said execution unit has an arithmetic circuit which computes an operand data and outputs the computed result.

51. A data processor formed on an LSI chip according to claim 48,
wherein each of the first entries and the second entries has a valid bit, and
wherein when said data processor executes the first instruction, the valid bits are cleared.

52. A data processor formed on an LSI chip according to claim 48,
wherein said cache memory is an associative memory.

53. A data processor formed on an LSI chip according to claim 47,
wherein said cache memory is an associative memory.

54. A data processor formed on an LSI chip according to claim 47,
wherein each of the first entries and the second entries has a valid bit, and
wherein when said data processor executes the first instruction, the valid bits are cleared.

55. A data processor formed on an LSI chip according to claim 47,
wherein the first instruction has a purge code, and
wherein when the data processor executes the first instruction, the data processor selects entries in said cache memory or/and said operand cache memory according to the purge code and makes the selected entries ineffective.

56. A data processor formed on an LSI chip according to claim 46, further comprising:
a purge control unit;
wherein said purge control unit outputs the first instruction when the purge signal is input into purge control unit.

57. A data processor formed on an LSI chip according to claim 46,
wherein the address transformation circuit is connected to the output part inside of the LSI chip.

58. A data processor formed on an LSI chip comprising:
an instruction address generator;
an instruction cache memory;
an instruction decoder;
an operand address generator; and
an operand cache memory,
wherein said instruction cache memory has entries each storing an instruction address and an instruction corresponding to the instruction address generated said instruction address generator in its entry,
wherein said instruction decoder is input an instruction from said instruction cache memory and outputs a decoded result,
wherein said operand address generator generates an operand address in response to the decoded result of said instruction decoder;
wherein said operand cache memory having entries each storing an operand address and operand data corresponding to the operand address in its entry, and
wherein the data processor executes an instruction that makes entries in both of said instruction cache memory and said operand cache memory ineffective.

59. A data processor formed on an LSI chip according to claim 58, further comprising:
an execution unit executing an instruction based on the decoded result at said instruction decoder,
wherein said instruction decoder and said execution unit can be operated in parallel.

60. A data processor formed on an LSI chip according to claim 59, further comprising:
a ROM storing a control information corresponding to an instruction,
wherein said ROM outputs the control information corresponding to an instruction output from said instruction cache memory.

61. A data processor formed on an LSI chip according to claim 59,
wherein said execution unit has an arithmetic circuit, the arithmetic circuit computing an operand data and outputting the computed result.

62. A data processor formed on an LSI chip according to claim 59,
wherein each of entries in said instruction cache memory and said operand cache memory has a valid bit, and
wherein when said data processor executes the first instruction, the valid bits of said instruction cache memory and said operand cache memory are cleared.

63. A data processor formed on an LSI chip according to claim 59,
wherein each of said instruction cache memory and said operand cache memory is an associative memory.

64. A data processor formed on an LSI chip according to claim 58,
wherein each of said instruction cache memory and said operand cache memory is an associative memory.

65. A data processor formed on an LSI chip according to claim 58,
wherein each of entries in said instruction cache memory and said operand cache memory has a valid bit, and
wherein when said data processor executes the first instruction, the valid bits of said instruction cache memory and said operand cache memory are cleared.

66. A data processor formed on an LSI chip according to claim 58, further comprising:
a purge control unit;
wherein said purge control unit outputs the first instruction when the purge signal is input into said purge control circuit.

67. A data processor formed on an LSI chip according to claim 58, further comprising:
an address transformation circuit,
wherein said address transformation circuit is input a logical address generated by said address generator and outputs a physical address corresponding to the logical address, and is connected to the output part inside of the LSI chip.

68. A data processor formed on an LSI chip comprising:
an instruction cache memory;
an instruction decoder;
an operand cache memory,
wherein said instruction cache memory stores an instruction address and an instruction corresponding to the instruction address,
wherein said instruction decoder decodes an instruction from said cache memory and outputs a decoded result,
wherein said operand cache memory stores an operand address and operand data corresponding to the operand address,
wherein said data processor invalidates the instruction and operand cache memories when said data processor executes a first instruction.

69. A data processor formed on an LSI chip according to claim 68, further comprising:
an execution unit executing an instruction based on the decoded result at said instruction decoder,
wherein said instruction decoder and said execution unit can be operated in parallel.

70. A data processor formed on an LSI chip according to claim 69, further comprising:
a ROM storing a control information corresponding to an instruction,
wherein said ROM outputs the control information corresponding to an instruction output from said instruction cache memory.

71. A data processor formed on an LSI chip according to claim 69,
wherein said execution unit has an arithmetic circuit, the arithmetic circuit computing an operand data and outputting the computed result.

72. A data processor formed on an LSI chip according to claim 69,
wherein each of entries in said instruction cache memory and said operand cache memory has a valid bit, and
wherein when said data processor executes the first instruction, the valid bits of said instruction cache memory and said operand cache memory are cleared.

73. A data processor formed on an LSI chip according to claim 69,
wherein each of said instruction cache memory and said operand cache memory are an associative memory.

74. A data processor formed on an LSI chip according to claim 68,
wherein each of said instruction cache memory and said operand cache memory are an associative memory.

75. A data processor formed on an LSI chip according to claim 68,
wherein each of entries in said instruction cache memory and said operand cache memory has a valid bit, and
wherein when said data processor executes the first instruction, the valid bits of said instruction cache memory and said operand cache memory are cleared.

76. A data processor formed on an LSI chip according to claim 68, further comprising:
a purge control unit;
wherein said purge control unit outputs the first instruction when the purge signal is input into said purge control unit.

77. A data processor formed on an LSI chip according to claim 68, further comprising:
an address transformation circuit,
wherein said address transformation circuit is input a logical address generated by said address generator and outputs a physical address corresponding to the logical address, and is connected to the output part inside of the LSI chip.

78. A data processor formed on an LSI chip according to claims 68,
wherein said instruction cache has first entries, each of the first entries stores an instruction address and an instruction corresponding to the instruction address,
wherein said instruction cache has second entries, each of the second entries stores an operand address and operand data corresponding to the operand address,
wherein said data processor invalidates the first entries and second entries when said data processor executes the first instruction.

79. A data processor formed on an LSI chip comprising:

an instruction cache memory;

an instruction decoder;

an operand address generator; and an operand cache memory, wherein said instruction cache memory has entries each storing an instruction address and an instruction corresponding to the instruction address, wherein said instruction decoder decodes an instruction from said instruction cache memory, wherein said operand address generator generates an operand address corresponding to a decoded result at the instruction decoder, wherein said operand cache memory has entries each storing an operand address and an operand data corresponding to the operand address, and wherein said instruction and operand memories is flushed by executing a first instruction.

80. A data processor formed on an LSI chip according to claim 79, further comprising:

an execution unit executing an instruction based on the decoded result at said instruction decoder, wherein said instruction decoder and said execution unit can be operated in parallel.

81. A data processor formed on an LSI chip according to claim 80, further comprising:

a ROM storing a control information corresponding to an instruction, wherein said ROM outputs the control information corresponding to an instruction output from said instruction cache memory.

82. A data processor formed on an LSI chip according to claim 80, wherein said execution unit has an arithmetic circuit, the arithmetic circuit computing an operand data and outputting the computed result.

83. A data processor formed on an LSI chip according to claim 80, wherein each of entries in said instruction cache memory and said operand cache memory has a valid bit, and wherein when said data processor executes the first instruction, the valid bits of said instruction cache memory and said operand cache memory are cleared.

84. A data processor formed on an LSI chip according to claim 80, wherein each of said instruction cache memory and said operand cache memory are an associative memory.

85. A data processor formed on an LSI chip according to claim 79, wherein each of said instruction cache memory and said operand cache memory are an associative memory.

86. A data processor formed on an LSI chip according to claim 79, wherein each of entries in said instruction cache memory and said operand cache memory has a valid bit, and wherein when said data processor executes the first instruction, the valid bits of said instruction cache memory and said operand cache memory are cleared.

87. A data processor formed on an LSI chip according to claim 79, further comprising:

a purge control unit;

wherein said purge control unit outputs the first instruction when the purge signal is input into said purge control unit.

88. A data processor formed on an LSI chip according to claim 79, further comprising:

an address transformation circuit, wherein said address transformation circuit is input a logical address generated by said address generator and outputs a physical address corresponding to the logical address, and is connected to the output part inside of the LSI chip.

89. A data processor formed on an LSI chip according to claim 79, wherein the entries in said instruction cache memory and said operand cache memory are flushed by said data processor when said data processor executes the first instruction.

* * * * *